United States Patent
Srinivasan et al.

(10) Patent No.: US 11,598,204 B2
(45) Date of Patent: Mar. 7, 2023

(54) METRIC-BASED SUSTAINABILITY INDEX FOR WELLBORE LIFE CYCLE

(71) Applicant: Landmark Graphics Corporation, Houston, TX (US)

(72) Inventors: Nagaraj Srinivasan, Sugar Land, TX (US); Robello Samuel, Cypress, TX (US)

(73) Assignee: Landmark Graphics Corporation, Houston, TX (US)

( * ) Notice: Subject to any disclaimer, the term of this patent is extended or adjusted under 35 U.S.C. 154(b) by 198 days.

(21) Appl. No.: 17/039,327

(22) Filed: Sep. 30, 2020

(65) Prior Publication Data

US 2021/0388717 A1     Dec. 16, 2021

Related U.S. Application Data

(60) Provisional application No. 63/037,108, filed on Jun. 10, 2020.

(51) Int. Cl.
| | |
|---|---|
| *G06F 11/30* | (2006.01) |
| *E21B 49/00* | (2006.01) |
| *G06N 3/08* | (2023.01) |
| *E21B 44/02* | (2006.01) |
| *E21B 44/00* | (2006.01) |
| *G06Q 10/0635* | (2023.01) |
| *G06Q 50/02* | (2012.01) |

(52) U.S. Cl.
CPC ............ *E21B 49/003* (2013.01); *E21B 44/00* (2013.01); *E21B 44/02* (2013.01); *G06N 3/08* (2013.01); *G06Q 10/0635* (2013.01); *G06Q 50/02* (2013.01)

(58) Field of Classification Search
CPC ..................................................... E21B 49/003
See application file for complete search history.

(56) References Cited

U.S. PATENT DOCUMENTS

| | | |
|---|---|---|
| 6,507,774 B1 * | 1/2003 | Reifman ................. F23N 5/003 |
| | | 700/32 |
| 8,336,028 B2 | 12/2012 | Hinton et al. |
| 8,645,195 B1 | 2/2014 | Shpritz et al. |

(Continued)

FOREIGN PATENT DOCUMENTS

WO     2016094338     6/2016

OTHER PUBLICATIONS

Hasheminasab et al., A Novel Metric of Sustainability for Petroleum Refinery Projects, Journal of Cleaner Production. Oct. 9, 2017 (Year: 2017).*

(Continued)

*Primary Examiner* — Phuong Huynh
(74) *Attorney, Agent, or Firm* — Kilpatrick Townsend & Stockton LLP

(57) ABSTRACT

A system can assign a value to one or more sustainability factors for a wellbore operation based on historical data. The system can determine, for each of the one or more sustainability factors, a weight. The system can determine a sustainability index corresponding to a predicted carbon footprint for the wellbore operation based on the weight and the value for each of the one or more sustainability factors. The system can output a command for adjusting the wellbore operation based on the sustainability index.

20 Claims, 11 Drawing Sheets

(56) References Cited

U.S. PATENT DOCUMENTS

| | | |
|---|---|---|
| 10,013,666 B2 | 7/2018 | Walker et al. |
| 2009/0099887 A1 | 4/2009 | Sklar et al. |
| 2020/0024930 A1 | 1/2020 | Yang et al. |

OTHER PUBLICATIONS

Hasheminasab et al., A Dynamic Sustainability framework for petroleum refinery projects with a life cycle attitude, Sustanable Development. Mar. 9, 2020 (Year: 2020).*
Landmark, "Digital Well Program", Product Sheet available at www.landmark.solutions at least as early as Apr. 28, 2020, 4 pages.
Landmark, "Real-Time Well Engineering", available on the internet at https://www.landmark.solutions/Real-Time-Well-Engineering at least as early as Apr. 28, 2020, 4 pages.
Landmark, "WellPlan Well Engineering Software", available on the internet at https://www.landmark.solutions/WellPlan-Well-Engineering-Software at least as early as Apr. 28, 2020, 2 pages.
Hasheminasab et al., "A Dynamic Sustainability Framework for Petroleum Refinery Projects with a Life Cycle Attitude", Sustainable Development, vol. 28, No. 5, Mar. 9, 2020, 16 pages.
Hasheminasab et al., "A Novel Metric of Sustainability for Petroleum Refinery Projects", Journal of Cleaner Production, vol. 171, 2018, pp. 1215-1224.
PCT Application No. PCT/US2020/053587, International Search Report and Written Opinion, dated Feb. 22, 2021, 10 pages.

* cited by examiner

| Functionalities and Optimization Index | ????? | | | |
|---|---|---|---|---|
| | Realtime | | | |
| | Controllable Variable | Mud | | |
| | | Hydraulics | | |
| | | Bit type | | |
| | | Weight | | |
| | Uncontrivable Variable | Formation | | |
| | | Depth | | |
| | | | | |
| | Cost per foot | | | |
| | Manpower cost | | | |
| | Site preparation | | | |
| | Logistics Cost | Onshore | | |
| | | Offshore | Boat rental | |
| | | | Supply vessel | |
| | | | Helicopter | |
| | | | others | |
| | Risk Managment | Barrier Elements | Types | Active |
| | | | | Passive |
| | | | Evaluation | |
| | | | Effectiveness | |
| | | | Risk Barriers | Selection |
| | | Barriers | ROP | |
| | | | Stuckpipe | |
| | | | Wellbore Stability | |
| | | | Loss Circulation | |
| | | | Casing Wear | |
| | | | Cementing issues | |
| | | S2M2 | | |
| | | ABP | Well Integrity | |
| | | ABR | | |
| | | Burst design | Disk | |
| | | | Foam | |
| | | | Innerstring design | |

From FIG. 6A-1

| Well and Maintenance Cost Index | | | | |
|---|---|---|---|---|
| | | | Outerstring burst | |
| | | | Hanger rating | |
| | | | Temperature | |
| | | | Hanger load | Wellhead |
| | | | Shoe Integrity | |
| | | | Casing connection | |
| | Uncertainty | Earthquake | | |
| | | Geopolitical | | |
| | | Viral | | |
| | | Other issues | Losy circulation | |
| | | | Shale problems | |
| | | | Abnormal pressures | |
| | | | Fishing Jobs | |
| | | | Cementing issues | |
| | | | Crew inefficiency | |
| | Financial Policies | | | |
| | Partnership | | | |
| | Lease payment | | | |
| | Litigation | | | |
| | Rate Depth | | | |
| | Cost Depth | | | |
| | Learning Curve | | | |
| | Energy Cost | | | |
| | Pore and Frac Window | | | |
| | Offset issues | | | |
| | Hazards | | | |
| | | Gas | Type | |
| | | Oil | Type | |
| | | Water | Salinity | |
| | Noise Level | | | |
| | Lighting Level | | | |

METRIC-BASED SUSTAINABILITY INDEX FOR WELLBORE LIFE CYCLE

CROSS REFERENCE TO RELATED APPLICATION

This claims priority to U.S. Ser. No. 63/037,108, titled "Metric-Based Sustainability Index for Wellbore Life Cycle" and filed Jun. 10, 2020, the entirety of which is incorporated herein by reference.

TECHNICAL FIELD

The present disclosure relates generally to wellbore planning, drilling, completion, and production operations and, more particularly (although not necessarily exclusively), to modelling a sustainability index for planning and executing a wellbore operation.

BACKGROUND

Hydrocarbon exploration is the search for hydrocarbons, such as oil or gas, within a subterranean formation. Greenhouse gas emissions resulting from wellbore operations can have a significant impact on the environment. A high carbon footprint for a wellbore operation can indicate inefficient processes or areas of the wellbore operation involving excessive resources. Determining a carbon footprint for a wellbore operation may be difficult due to a large amount of data to be analyzed, among other factors. And, even if the carbon footprint is determined, it is usually determined later than a time when adjustments can be made. Determining the carbon footprint earlier and during multiple phases of the wellbore operation can prevent a high carbon footprint. Thus, understanding a carbon footprint for wellbore operations can provide significant value for efficient development of hydrocarbon resources.

BRIEF DESCRIPTION OF THE DRAWINGS

FIGS. 6A-1, 6A-2, 6B, and 6C are diagrams of a neural network for use in determining a sustainability index according to one example of the present disclosure.

DETAILED DESCRIPTION

Certain aspects and examples of the present disclosure relate to modeling wellbore sustainability into an index for planning and executing wellbore drilling, completion, and production. Wellbore sustainability relates to an impact on an environment as a result of operations for implementing a particular well design. It may be advantageous to reduce a carbon footprint (e.g., greenhouse gas emissions) or societal impact of a life cycle of a well. A sustainability index can allow for analysis of the wellbore sustainability for the particular well design over a life cycle of the well.

Wellbore sustainability assessment remains a challenge, even with digital technologies, such as real-time embedded sensors, distributed public ledger (e.g., blockchain technologies), IOT or IiOT sensors, cloud computing, digital twins, edge computing, and cloud communication, available. There can be benefits in providing the sustainability index for wellbore engineering products in a quantitative manner, rather than employing a qualitative approach. Some examples of the present disclosure can avoid some of the vagueness of well sustainability and can be used and applied in a practical manner. A sustainability index according to some examples can be based on various metrics and weightage assigned when a wellbore is planned and designed. A physics-based approach can be used that defines boundaries and thresholds for well life cycle. Evaluating the sustainability index for wellbore engineering can be based on: (1) environmental impact, (2) well design and engineering impact, (3) functionality and optimization impact, (4) well and maintenance costs impact, (5) health and safety impact, and (6) societal impact.

These elements can provide a six-layer evaluation index. Final normalization, weighting, score aggregation, and display upon the end of design can be used to formulate and display the index. The index may also be viewed through a digital well program and in real time as the well is drilled. In addition to real-time analysis and estimating the sustainability for the life of the well, the index can be used to adjust drilling parameters in real-time and predict future sustainability.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
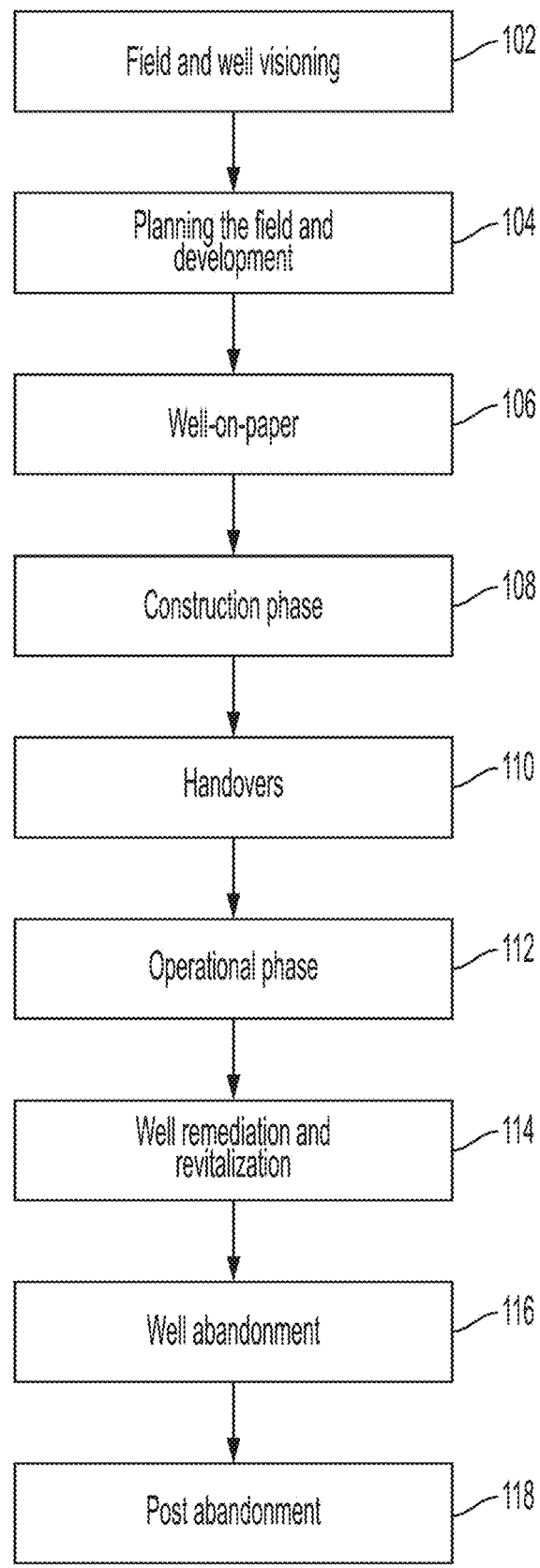
FIG. 1 is a flow of a life cycle of a well according to one example of the present disclosure.

FIG. 1 is a flow of a life cycle of a well design according to one example of the present disclosure. A sustainability index corresponding to a predicted carbon footprint for the well design may be impacted by a number, type, or completion time of wells of the well design. The impact of sustainable environmental management can be understood during a planning stage and during the life of wells of the well design, to view and understand possible outcomes. The sustainability index can indicate an influence of a well throughout the life of the well (e.g., planning to abandonment).

The life cycle of a well design can begin with field and well visioning 102, and then the field can be planned and developed 104. A well in the field can be planned, as represented by "well-on-paper" 106. An initial sustainability index for the well design may be determined during one of these phases. Historical data for sustainability factors including an environmental impact, a well design and engineering impact, a functionality and optimization impact, a well and maintenance costs impact, a health and safety impact, and a societal impact can be used in a physics-based or machine-learning model to determine the initial sustainability index. Adjustments for the well design can be determined based on the initial sustainability index. For example, if the initial sustainability index is below a predefined minimum threshold adjustments to improve the initial sustainability index can be determined. Exemplary adjustments include a number of wells in the well design, a time of completion for the well design, or a type of well (e.g., oil and water, onshore, offshore, etc.) in the well design.

After the field is planned, the well design can be constructed during a construction phase 108, followed by handovers 110 for an operational phase 112 in which hydrocarbon fluid can be produced from the wellbore. During production, wells of the well design may undergo well remediation and revitalization processes 114. Following production, the wells can be abandoned 116 and post abandonment processes 118 applied. A sustainability index can be determined during any of these phases to understand an ongoing impact of the well design. Because calculating the sustainability index in real time is a dynamic process, real-time data can be used along with historical data to calculate the sustainability index. Additional adjustment for the wellbore operation, such as an adjustment for drilling parameters, may be determined based on the sustainability index.

Figure 2:
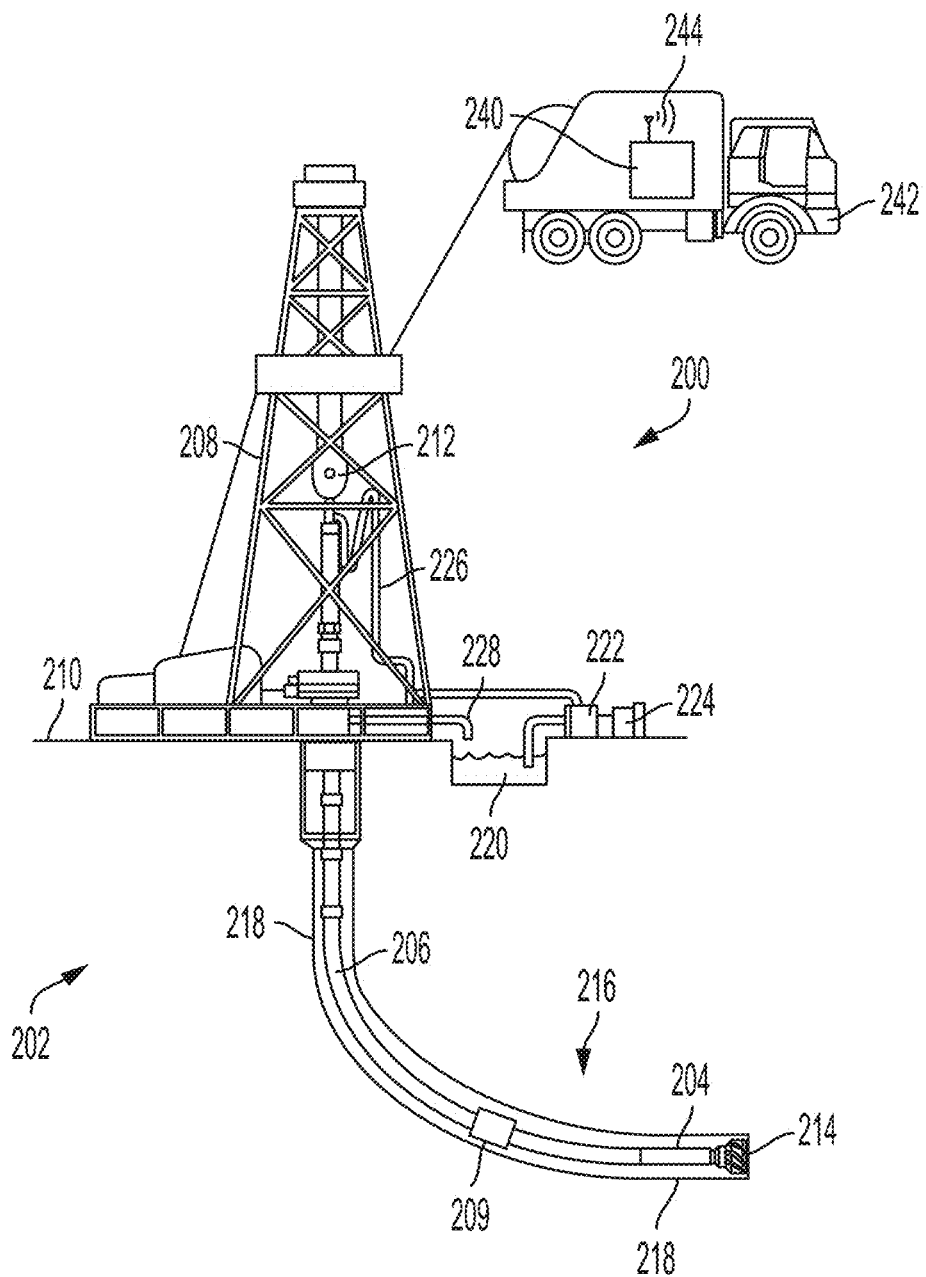
FIG. 2 is a cross-sectional view of a wellbore drilling system according to one example of the present disclosure.

FIG. 2 is a cross-sectional view of a wellbore drilling system 200 according to one example of the present disclosure. A wellbore 218 used to extract hydrocarbons may be created by drilling into a subterranean formation 202 using the drilling system 200. The wellbore 218 may be formed with drilling equipment accounting for a sustainability index formulated during a planning stage.

The drilling system 200 may include a bottom hole assembly (BHA) 204 positioned or otherwise arranged at the bottom of a drill string 206 extended into the subterranean formation 202 from a derrick 208 arranged at the surface 210. The derrick 208 includes a kelly 212 used to lower and raise the drill string 206. The BHA 204 may include a drill bit 214 operatively coupled to a tool string 216, which may be moved axially within a drilled wellbore 218 as attached to the drill string 206. Tool string 216 may include one or more sensors 209, for determining conditions in the wellbore. Sensors 209 may be positioned on drilling equipment and sense values of drilling parameters for a drilling operation. The sensors can send signals to the surface 210 via a wired or wireless connection, and the sensors may send real-time data relating to the drilling operation to the surface 210. The combination of any support structure (in this example, derrick 208), any motors, electrical equipment, and support for the drill string and tool string may be referred to herein as a drilling arrangement.

During operation, the drill bit 214 penetrates the subterranean formation 202 and thereby can create the wellbore 218. The BHA 204 provides control of the drill bit 214 as it advances into the subterranean formation 202. The combination of the BHA 204 and drill bit 214 can be referred to as a drilling tool. Fluid or "mud" from a mud tank 220 may be pumped downhole using a mud pump 222 powered by an adjacent power source, such as a prime mover or motor 224. The mud may be pumped from the mud tank 220, through a stand pipe 226, which feeds the mud into the drill string 206 and conveys the same to the drill bit 214. The mud exits one or more nozzles (not shown) arranged in the drill bit 214 and in the process cools the drill bit 214. After exiting the drill bit 214, the mud circulates back to the surface 210 via the annulus defined between the wellbore 218 and the drill string 206, and hole cleaning can occur which involves returning the drill cuttings and debris to the surface. The cuttings and mud mixture are passed through a flow line 228 and are processed such that a cleaned mud is returned down hole through the stand pipe 226 once again.

The drilling arrangement and any sensors (through the drilling arrangement or directly) can be connected to a computing device 240. In FIG. 2, the computing device 240 is illustrated as being deployed in a work vehicle 242; however, a computing device to receive data from sensors and to control drill bit 214 can be permanently installed with the drilling arrangement, be hand-held, or be remotely located. Although one computing device 240 is depicted in FIG. 2, in other examples, more than one computing device can be used, and together, the multiple computing devices can perform operations, such as those described in the present disclosure.

The computing device 240 can include a processor interfaced with other hardware via a bus. A memory, which can include any suitable tangible (and non-transitory) computer-readable medium, such as random-access memory ("RAM"), read-only memory ("ROM"), electrically erasable and programmable read-only memory ("EEPROM"), or the like, can embody program components that configure operation of the computing device 240. In some aspects, the computing device 240 can include input/output interface components (e.g., a display, printer, keyboard, touch-sensitive surface, and mouse) and additional storage.

The computing device 240 can include a communication device 244. The communication device 244 can represent one or more of any components that facilitate a network connection. In the example shown in FIG. 2, the communication devices 244 are wireless and can include wireless interfaces such as IEEE 802.11, Bluetooth, or radio interfaces for accessing cellular telephone networks (e.g., transceiver/antenna for accessing a CDMA, GSM, UMTS, or other mobile communications network). In some examples, the communication devices 244 can use acoustic waves, surface waves, vibrations, optical waves, or induction (e.g., magnetic induction) for engaging in wireless communications. In other examples, the communication device 244 can be wired and can include interfaces such as Ethernet, USB, IEEE 1394, or a fiber optic interface. In an example with at least one other computing device, the computing device 240 can receive wired or wireless communications from the other computing device and perform one or more tasks based on the communications. For example, the computing device 240 can be used to formulate a sustainability index for the well, use it to control drilling parameters, and output a display for monitoring the index through the life of the well, such as during the completion stage and the production stage.

Figure 3:
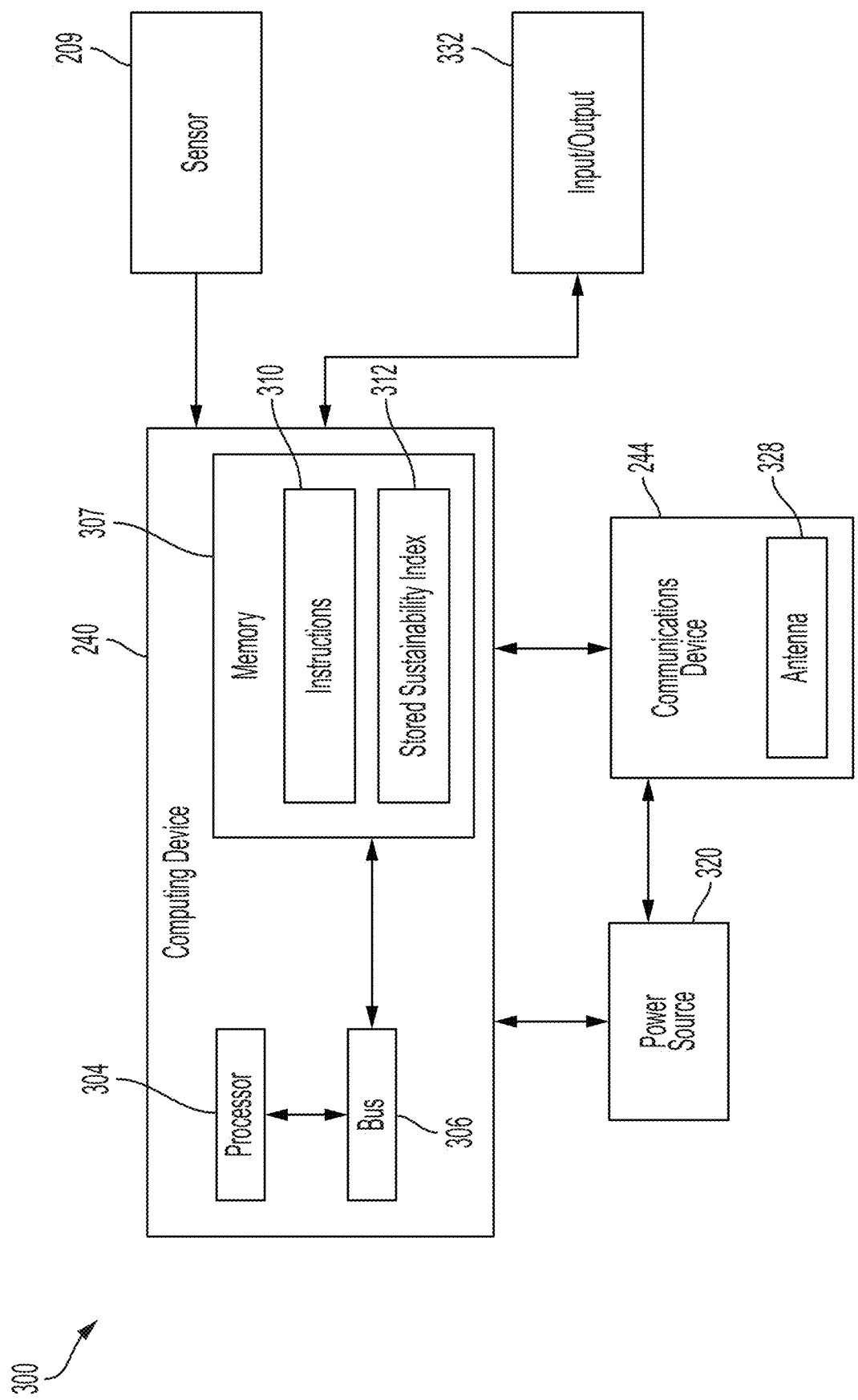
FIG. 3 is a block diagram of a computing system for generating and using a sustainability index through a well life cycle according to one example of the present disclosure.

FIG. 3 is a block diagram of a computing system 300 for generating and using a sustainability index through a well life cycle according to one example of the present disclosure. The computing system 300 includes the computing device 240. The computing device 240 can include a processor 304, a memory 07, and a bus 306. The processor 304 can execute one or more operations for automatically controlling the drilling operation. The processor 304 can execute instructions stored in the memory 307 to perform the operations. The processor 304 can include one processing device or multiple processing devices or cores. Non-limiting examples of the processor 304 include a Field-Programmable Gate Array ("FPGA"), an application-specific integrated circuit ("ASIC"), a microprocessor, etc.

The processor 304 can be communicatively coupled to the memory 307 via the bus 306. The non-volatile memory 307 may include any type of memory device that retains stored information when powered off. Non-limiting examples of the memory 307 include EEPROM, flash memory, or any other type of non-volatile memory. In some examples, at least part of the memory 307 can include a medium from which the processor 304 can read instructions. A computer-readable medium can include electronic, optical, magnetic, or other storage devices capable of providing the processor 304 with computer-readable instructions or other program code. Non-limiting examples of a computer-readable medium include (but are not limited to) magnetic disk(s), memory chip(s), ROM, RAM, an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

In some examples, the memory 307 can include computer program instructions 310 for generating a sustainability index 312, using it to control drilling parameters, and outputting a display for monitoring the sustainability index for the life cycle of the well. During a design phase of a wellbore operation, the computing system 300 may generate the sustainability index 312 by determining a value for one or more sustainability factors based on historical data. The computing system 300 can determine a first weight for each sustainability factor based on the value using a machine-learning model (e.g., artificial neural network). Additionally, the computing system 300 may perform operations based on the first weights for the sustainability factors to determine the sustainability index 312. For example, the computing system 300 may combine the weights for the sustainability factors or take a weighted average of the values using the weights to determine the sustainability index 312. The computing system 300 can additionally determine an error associated with the sustainability index 312. The computing system 300 may recalculate the sustainability index 312 until the error is below a predefined threshold (e.g., 10%). The sustainability index with the error below the predefined threshold can be output as the sustainability index 312. The sustainability index 312 can be stored in the memory 307.

During an execution phase of the wellbore operation, the computing system 300 can use the value for each of the sustainability factors and real-time data to determine a second sustainability index. The computing system 300 can compare the first sustainability index 312 to the second sustainability index to determine adjustments for the wellbore operation. For example, if the second sustainability index is worse than the first sustainability index 312, the computing system 300 can determine adjustments for the wellbore operation. The computing system 300 may additionally determine adjustments if the sustainability index is below a threshold value. The computing system 300 can output a command to cause the adjustments. For example, the computing system 300 may output a command for controlling drilling parameters known to improve the sustainability index.

The computing system 300 may additionally monitor sustainability indices for multiple wellbore operations associated with an asset or a company. The computing system 300 can determine an overall sustainability index for the asset or company by combining the sustainability indices for individual wellbore operations. For example, the computing system 300 can average the sustainability indices to determine the overall sustainability index. In another example, the computing system 300 may determine weights for the sustainability indices and determine a weighted average for the overall sustainability index. The computing system 300 can determine adjustments for current or future wellbore operations based on determining the overall sustainability index exceeds a predefined threshold.

The computing system 300 can additionally perform an uncertainty analysis to determine an impact of each of the sustainability factors on the sustainability index 312. The computing system 300 may also determine an impact for sub-elements (e.g., type of well, number of wells, well direction, drilling fluid) of each sustainability factor on the weight determined for the sustainability factor. As a result, the computing system 300 can determine adjustments for the wellbore operation. For example, if the computing system 300 determines the sustainability factor of the health and safety impact contributes the most to the sustainability index 312, the computing system 300 can determine and output adjustments to decrease the health and safety impact as opposed to adjustment to decrease a different sustainability factor. The uncertainty analysis can also provide real-time monitoring and future prediction of a cost implication of the wellbore operation. Over time, the computing system 300 may determine the cost implication is increasing. The uncertainty analysis can determine one or more sustainability factors or sub-elements contributing to the increase in cost.

The computing system 300 can include a power source 320. The power source 320 can be in electrical communication with the computing device 240 and the communications device 244. In some examples, the power source 320 can include a battery or an electrical cable (e.g., a wireline). In some examples, the power source 320 can include an AC signal generator. The computing device 240 can operate the power source 320 to apply a transmission signal to the antenna 328 to forward data relating to drilling parameters, sustainability index monitoring, etc. to other systems. For example, the computing device 240 can cause the power source 320 to apply a voltage with a frequency within a specific frequency range to the antenna 328. This can cause the antenna 328 to generate a wireless transmission. In other examples, the computing device 240, rather than the power source 320, can apply the transmission signal to the antenna 328 for generating the wireless transmission.

In some examples, part of the communications device 244 can be implemented in software. For example, the communications device 244 can include additional instructions stored in memory 307 for controlling functions of the communication device 244. The communications device 244 can receive signals from remote devices and transmit data to remote devices. For example, the communications device 244 can transmit wireless communications that are modulated by data via the antenna 328.

The computing system 300 can receive input from sensor (s) 209. The computing system 300 in this example also includes input/output interface 332. Input/output interface 332 can connect to a keyboard, pointing device, display, and other computer input/output devices. An operator may provide input using the input/output interface 332. The sustainability index 312 can be included in a display that is outputted via the input/output interface 332, and performance of the well with respect to the sustainability index 312 can be analyzed and displayed.

In some examples, the components shown in FIG. 3 (e.g., the computing device 240, power source 320, and communications device 244) can be integrated into a single structure. For example, the components can be within a single housing. In other examples, the components shown in FIG.

3 can be distributed (e.g., in separate housings) and in electrical communication with each other.

Figure 4:
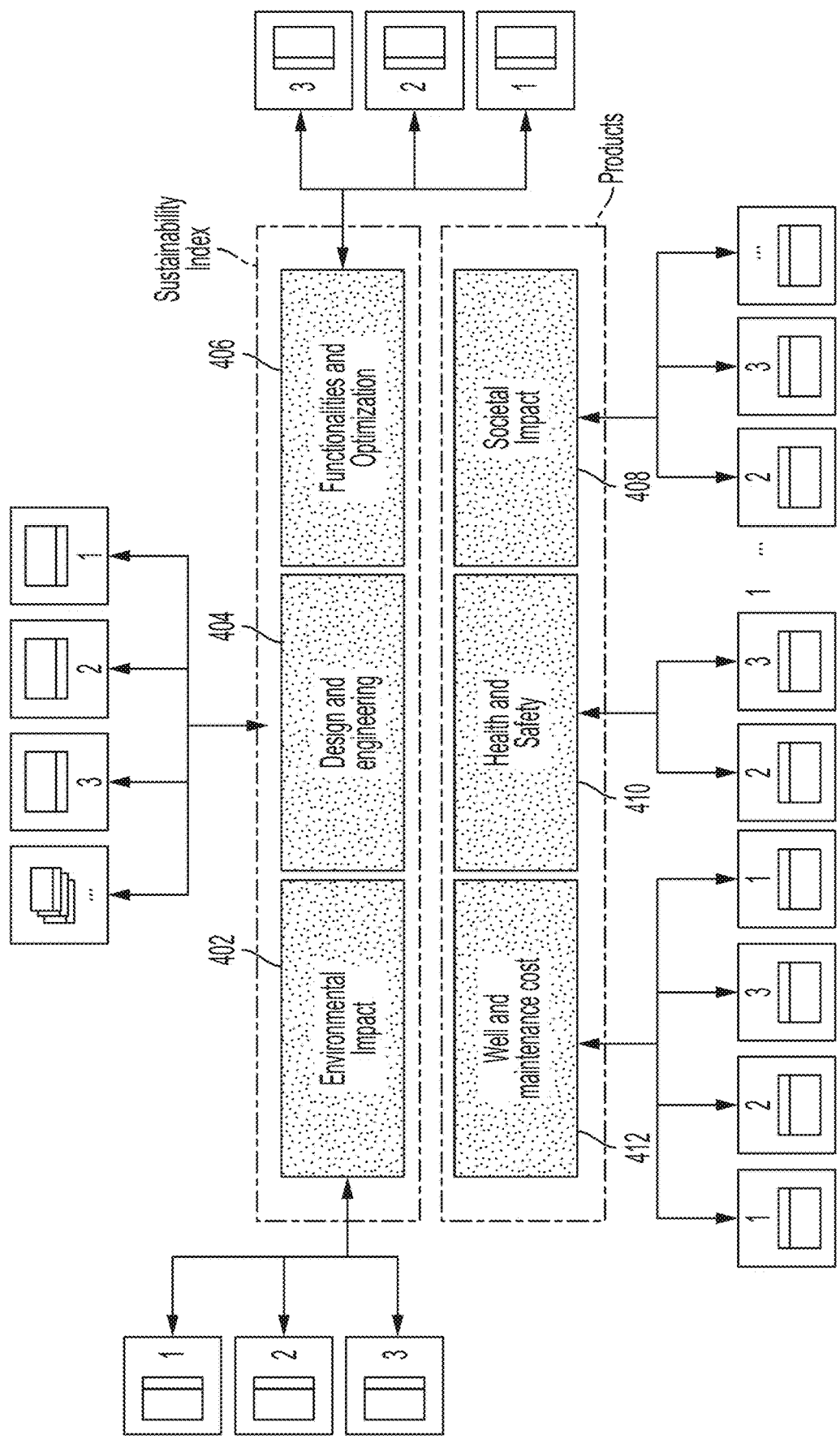
FIG. 4 is a block diagram of sustainability factors for use in a sustainability index according to one example of the present disclosure.

FIG. 4 is a block diagram of sustainability factors for use in a sustainability index according to one example of the present disclosure. A sustainability index according to some examples can uses a physics-based approach that defines boundaries and thresholds for a well life cycle. Evaluating the sustainability index for well engineering can be based on the elements shown in FIG. 4, including an environmental impact 402, a well design and engineering impact 404, a functionality and optimization impact 406, a well and maintenance costs impact 412, a health and safety impact 410, and a societal impact 408. The environmental impact 402 can correspond to an impact on an environment for a particular well design. The well design and engineering impact 404 can correspond to an impact of technical limits of the particular well design with reference to sustainability. The functionality and optimization impact 406 can correspond to an impact of practical limits of the particular well design with reference to sustainability. The well and maintenance costs impact 412 can correspond to an impact of lifecycle costs for the particular well design. The health and safety impact 410 can correspond to an impact of hazardous events for the particular well design. The societal impact 408 can correspond to a societal reaction to the particular well design. Other sustainability factors may also or alternatively be considered.

Each sustainability factor can include sub-elements. Exemplary sub-elements include a type of well (e.g., oil and gas, development well, appraisal well), a number of wells in the well design, a length of time for the wellbore operation, and a location (e.g., offshore or onshore) of a well in the well design. Final normalization, weighting, score aggregation, and display upon the end of design can also be included. The sustainability index can also be viewed through a digital well program and in real time as the well is drilled.

The elements shown in FIG. 4 can provide a six-layer evaluation index. The approach of this methodology can be a "physics-led" and "data informed" approach with overlain uncertainty. This can provide a platform for building more sophisticated models for use with artificial intelligence.

In some examples, a sustainability index for well engineering can be represented as:

$$WESI = \int_{n=1}^{n=n} \frac{E_n}{n}, \quad (1)$$

where n is the total number of sustainability factors and E is an aggregate of the sustainability factors.

The representation for a sustainability index can be rewritten with weights for each sustainability factor as:

$$WESI = \int_{n=1}^{n=m} \frac{w_n e_n}{n} + \int_{n=p}^{n=q} \frac{w_n e_n}{n} + \int_{n=r}^{n=s} \frac{w_n e_n}{n} + \cdots, \quad (2)$$

The representation can be further expanded as follows:

$$WESI = \frac{1}{n}\sum_{i=1}^{n}\sum_{j=1}^{m_i} w_i^j e_i^j, \quad (3)$$

with n the total number of sustainability factors, $w_i^j$ the weighting for the $i^{th}$ sustainability factor, and $e_i^j$ the value of the $j^{th}$ sub-element in the $i^{th}$ sustainability factor.

Further data normalization can be performed to derive a dimensionless number. The sustainability index can be visualized in various forms, such as a numerical value or a classification—e.g., poor, medium, good, and excellent.

Figure 5:
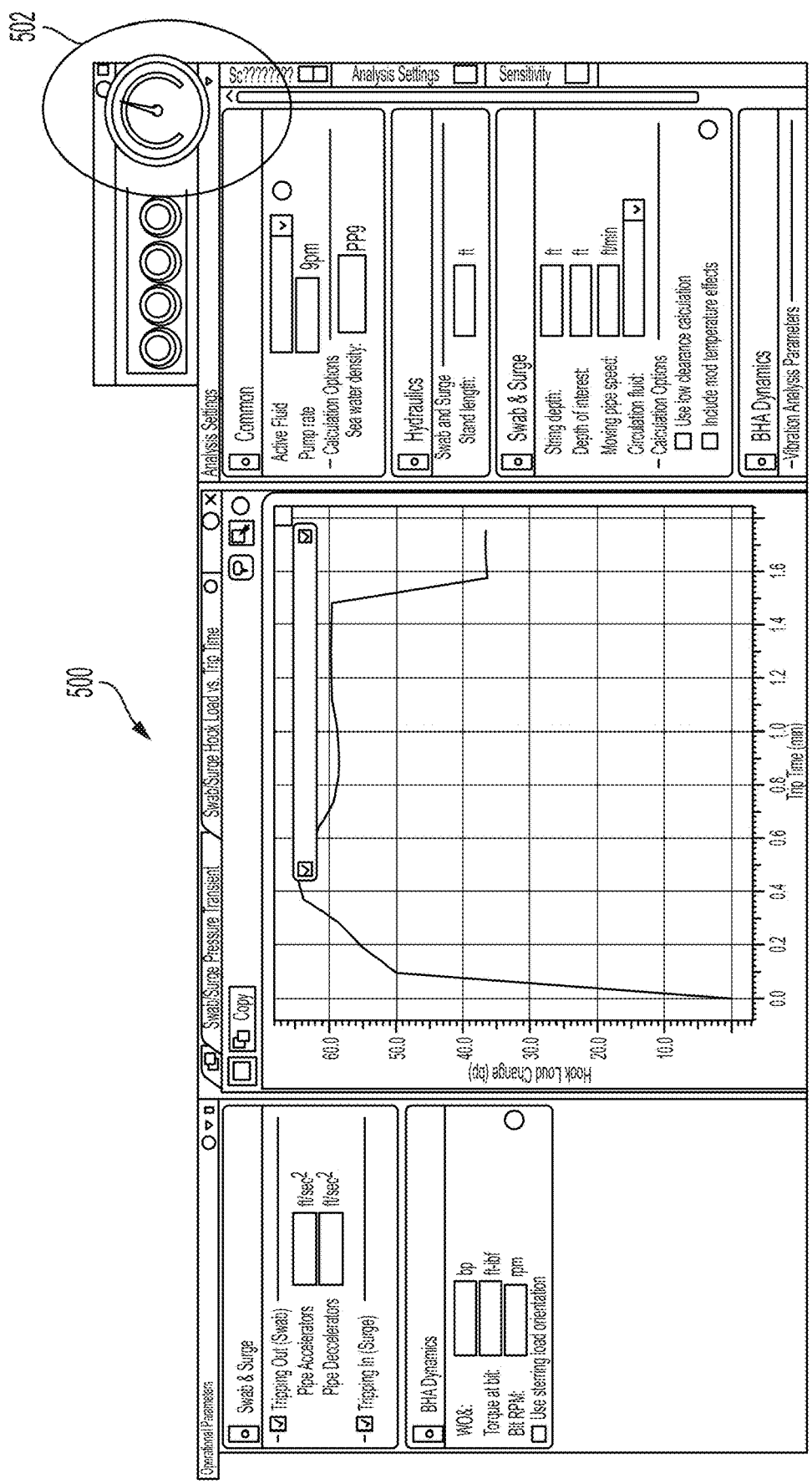
FIG. 5 is an example of a visualization of a sustainability index according to one example of the present disclosure.

FIG. 5 is an example of a visualization of a sustainability index according to one example of the present disclosure. The classification for the sustainability index in FIG. 5 is represented as a dial 502. The sustainability index may additionally or alternatively be represented and displayed numerically. Considering the life of the well, a comprehensive sustainability index can be developed incorporating start to abandonment at the design stage as well as during the development phase. This can assist well planners and asset managers in achieving maximum well sustainability.

A sustainability index can be expanded to other products considering the life cycle of the well and the importance of engineering analysis. For example, the sustainability index can be expanded to wellhead movement, trapper-annular pressure buildup, maximum allowable surface pressure, temperature and pressure effects on well integrity, casing wear, corrosion, and erosion significance, as well as zonal isolation and estimation of the tubing or casing safety factor as quantifiable values considering the life of the well and asset as a whole.

FIGS. 6A-1, 6A-2, 6B, and 6C are diagrams of a neural network for use in determining a sustainability index according to one example of the present disclosure. Various methods can be applied to determine weights for calculating a sustainability index, for example a scoring method, a relative scoring method, a statistical approach, fuzzy logic, an analytic hierarchy process (AHP), artificial neural networks (ANNs), a wavelet neural network method, and a combination of fuzzy logic and ANN.

The process can involve individual indexing through backpropagation of neural networks combined to obtain the final overall sustainability index, as shown in FIGS. 6A-1, 6A-2, 6B, and 6C. This approach can provide for tracking a particular sustainability factor that is heavily contributing to the overall sustainability index, or one that is less-contributing to the overall sustainability index.

FIGS. 6A-1 and FIG. 6A-2 together depict an example of a chart of sustainability factors and sub-elements usable in determining the sustainability index. The chart includes a functionality and optimization impact and a well and maintenance cost impact. The functionality and optimization impact includes a category for controllable variables and a category for uncontrivable variables, each of which include sub-elements. Additional, uncategorized sub-elements are also included in the functionality and optimization impact. For example, these sub-elements include a cost per foot, realtime, and a manpower cost. A value may be assigned to each sustainability factor or sub-element based on historical data. The value can be within a predetermined range of values (e.g., zero to five or zero to ten).

Figure 6C:
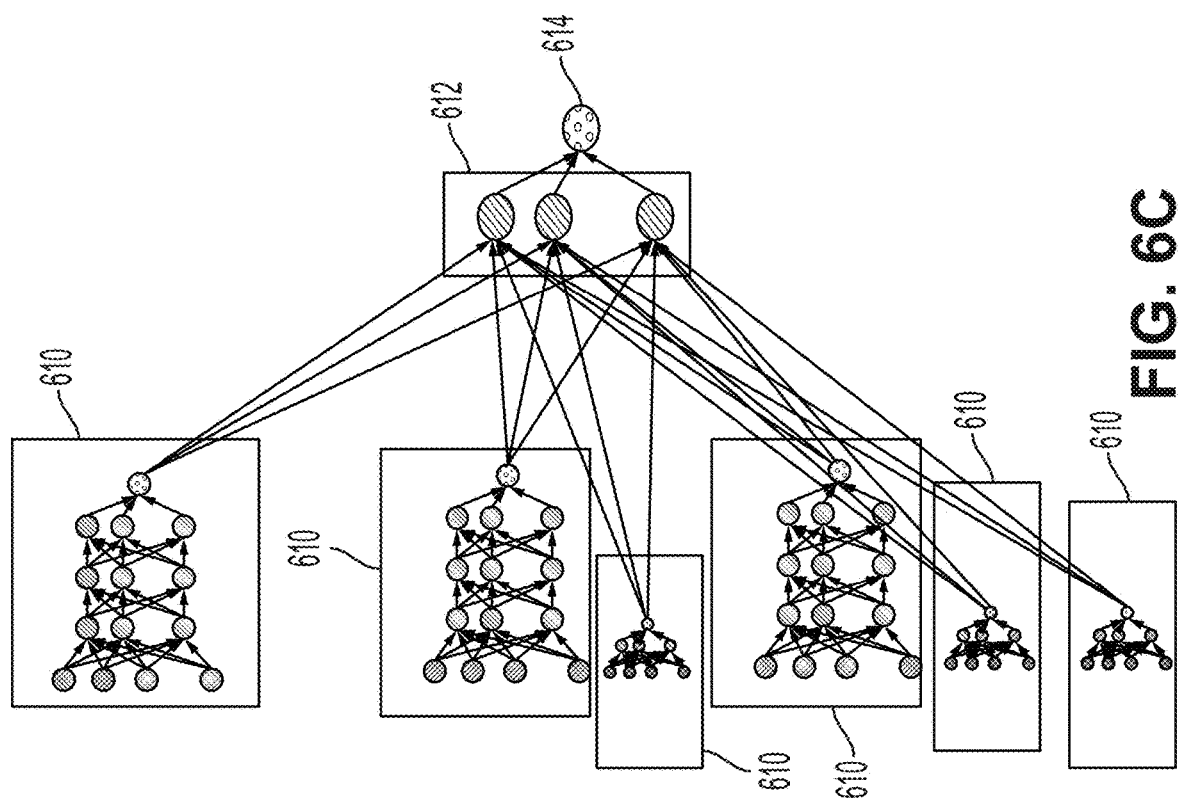
Figure 6B:
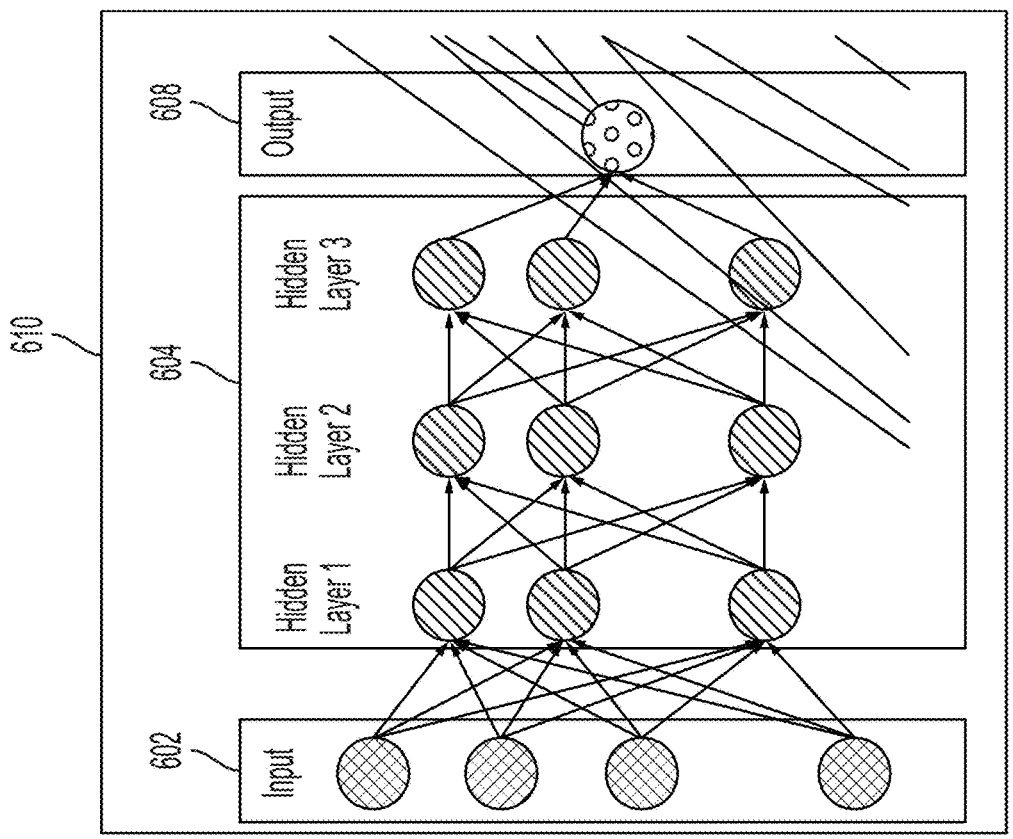

The values can be input to an artificial neural network, as shown in FIGS. 6B-C, to determine a weight for each sustainability factor. A weight may additionally or alternatively be determined for each sub-element. The artificial neural network can be trained using historical data of sustainability factors and sub-elements from previous well designs and wellbore operations. In some examples, a different artificial neural network can be trained for each sustainability factor. Alternatively, one artificial neural network may be trained to output the weight for each sustainability factor.

FIG. 6B shows a sub-network 610 that includes an input layer 602, one or more hidden layers 604, and a weight output 608. The sub-network 610 can determine a weight for sub-elements (e.g., offshore boat rental cost, offshore helicopter cost, weight, hydraulics, bit type, and depth) for a sustainability factor. The input layer 602 can receive the values for the sub-elements or the sustainability factors. The one or more hidden layers 604 can perform operations based on training to determine the weight output 608.

FIG. 6C shows an exemplary artificial neural network determining a sustainability factor weight 614 based on the weight output 608 of multiple sub-networks 610. The artificial neural network can include one or more additional hidden layers 612 to determine the weight for each sustainability factor. A physics-based approach may be used to determine the sustainability index from the values and the weights of each sustainability factor. In some examples, the artificial neural network may output a second value for each sustainability factor that can be used to determine the sustainability index. While FIG. 6C shows the sustainability factor weight 614 being determined from six sub-networks 610, other examples may include additional or fewer sub-networks 610. Additionally, the number of hidden layers 604 and 612 may vary.

The artificial neural network may use an echolocation method to determine the sustainability factor weight 614. The echolocation method can be a form of Bat algorithm that searches for a global optimal solution (e.g., weight). This algorithm is a type of optimized technology based on an iteration approach. A random solution can be initialized, followed by searching for the best solution by iteration. Meanwhile, a local new solution can be created by means of random flying, and it can strengthen the local search. It can provide improved accuracy and efficiency, in addition to using fewer parameters.

A rule can be defined to update the virtual position, xi, velocity, vi, with d-dimensional search space, as the following equations shows:

$$f_i = f_{min} + (f_{max} - f_{min})\beta, \quad (4)$$

$$v_i^t = v_i^{t-1} + (x_i^t - x_+)f_i, \quad (5)$$

$$x_i^t = x_i^{t-1} + v_i^t, \quad (6)$$

Meanwhile, $\beta$ is a random vector in range of [0,1], and $x_+$ is the current global optimal solution, found by n virtual bats. Because Lambdafi is a constant, $f_i$ can be used to adjust the velocity and fix the other, depending on the problem type. Therefore, $f_{min}=0$, and $f_{max}=0$ (4). Initially, each virtual bat can be distributed by a frequency within the range of [$f_{min}$, $f_{max}$]. When referring to the local search, a new solution can be created by a random flying virtual bat once one is selected among the optimal solutions.

$$x_{new} = x_{old} + \in A^t, \quad (7)$$

Figure 7:
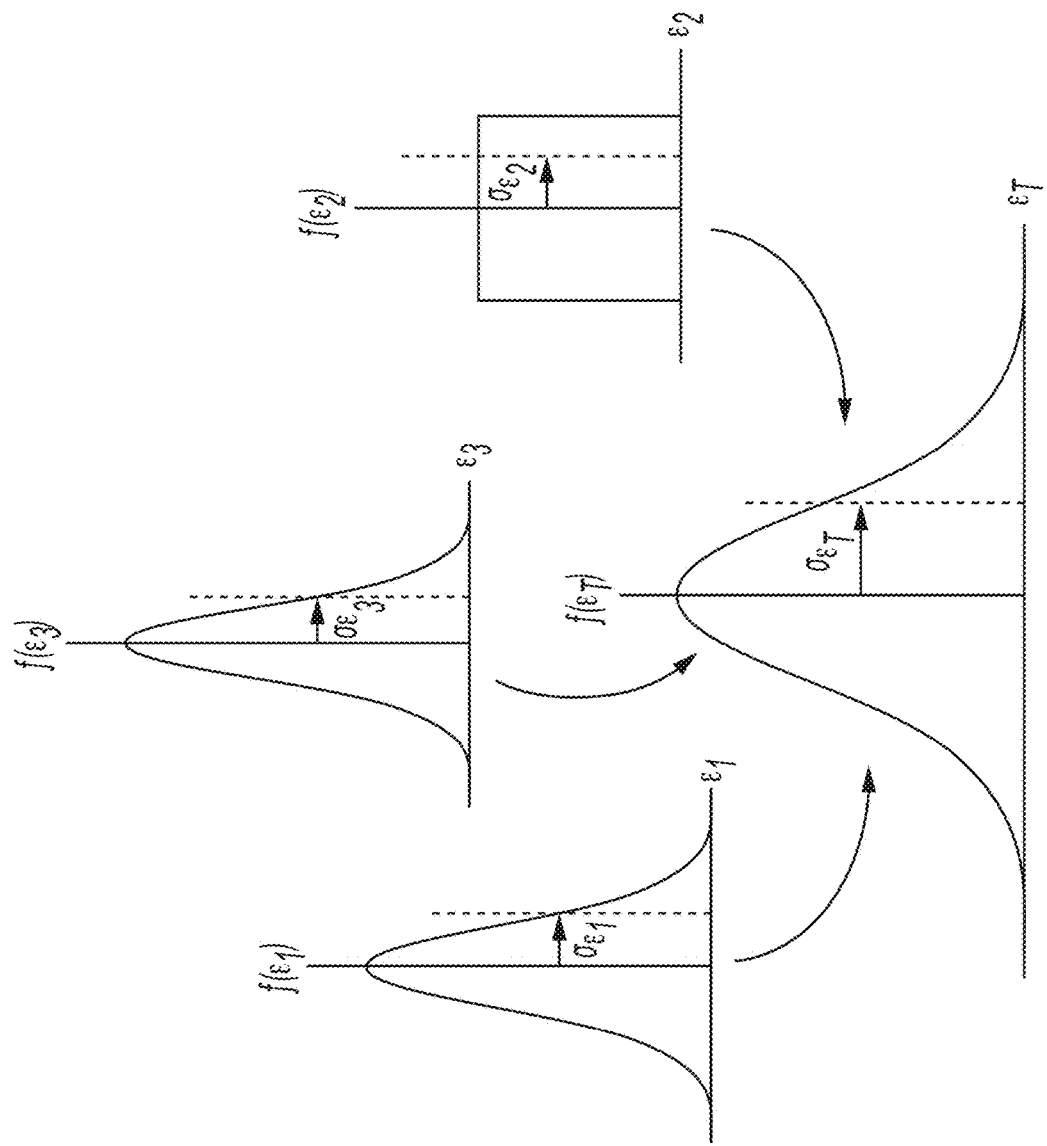
FIG. 7 is a diagram of uncertainty analysis for a sustainability index according to one example of the present disclosure.

FIG. 7 is a diagram of uncertainty analysis for a sustainability index according to one example of the present disclosure. Because the well life cycle involves several nonlinear system and asymmetric inputs, the effects of input uncertainties and other related calculation uncertainties can be identified. Examples of uncertainties can include variation and errors in log data, survey data, etc., variation and errors in drilling parameters, well engineering and life cycle model uncertainties, simplified models, and computational uncertainties.

Uncertainty analysis can calculate risks involved without assigning preferential weights to some of the sustainability factors. The method may not reduce uncertainty, but can estimate the influence of various sustainability factors or sub-elements on the sustainability index. This can provide a method for performing more in depth sensitivity analysis on input variables on the output sustainability index. And, an understanding of the risk involved can be provided based on the outcome of the output. Various techniques can be used to estimate uncertainty in the model. Different weight distribution, as shown in FIG. 7, can be combined when estimating output uncertainty. Sometimes, a stochastic multi-criteria decision analysis method is also used.

Figure 8:
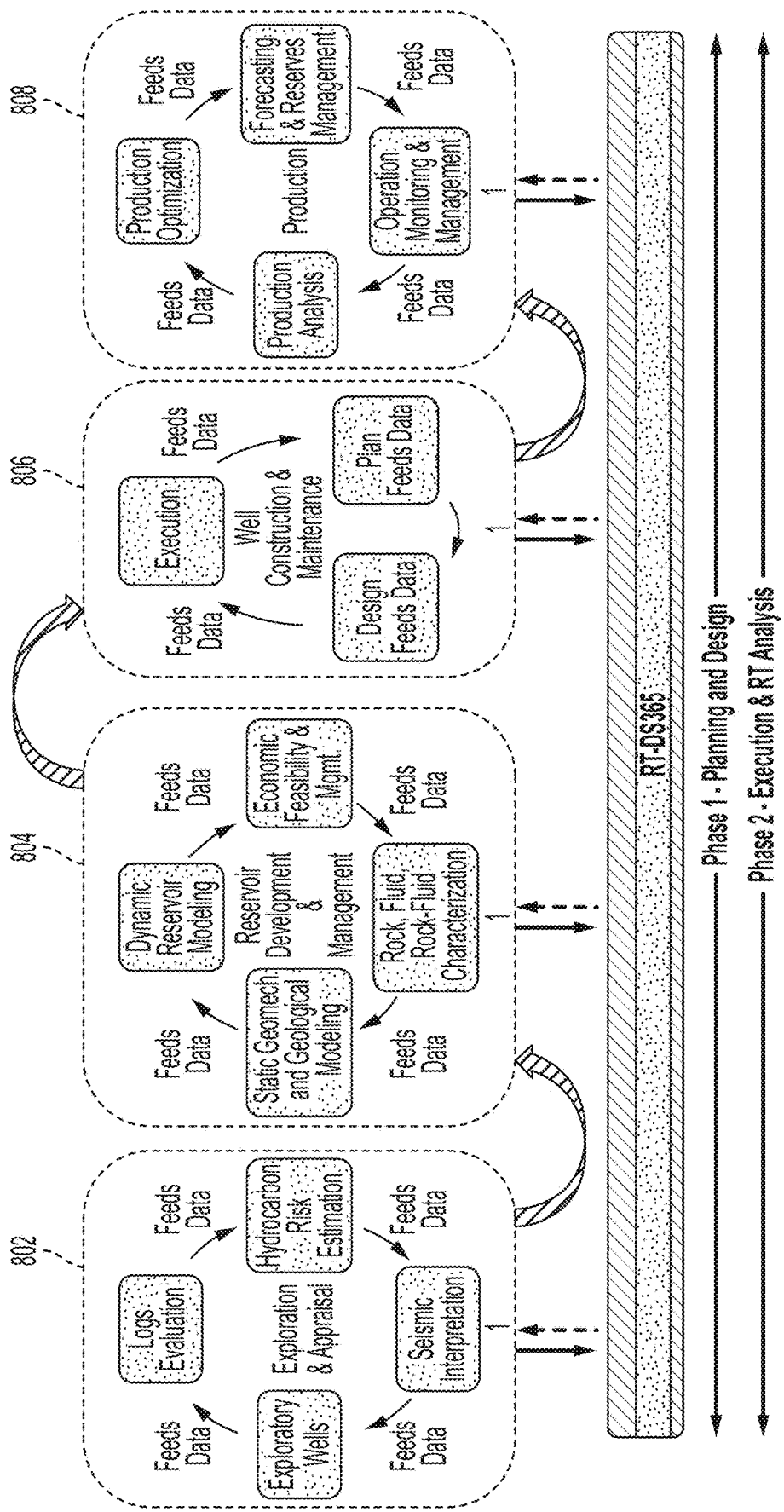
FIG. 8 is a process for determining a sustainability index for a total well life cycle according to one example of the present disclosure.

FIG. 8 is a process for determining a sustainability index for a total well life cycle according to one example of the present disclosure. Multiple segments of a wellbore operation can be combined to estimate the sustainability index for the total well life cycle. A first sustainability index can be determined during an exploration and appraisal phase 802. A second sustainability index during a reservoir development and management phase 804 can also be determined. Additionally, a third sustainability index can be determined during a well construction and maintenance phase 806. A fourth sustainability index can be determined during a production phase 808. An average of the sustainability index for a current phase and the previous phase(s) may be calculated to determine the sustainability index for the total well life cycle. For example, the sustainability index determined during the production phase 808 can be averaged with the sustainability index from each of the exploration and appraisal phase 802, the reservoir development and management phase 804, and the well construction and maintenance phase 806 to determine the sustainability index for the total well life cycle.

The sustainability indices may additionally be compared to each other to determine whether the wellbore operation is on track with regards to sustainability. For example, the first sustainability index for the exploration and appraisal phase 802 may be compared with the second sustainability index for the reservoir development and management phase 804 to determine whether the sustainability index has decreased during the reservoir development and management phase 804. The comparison may be used to determine adjustments for the wellbore operation to improve the sustainability index.

Figure 9:
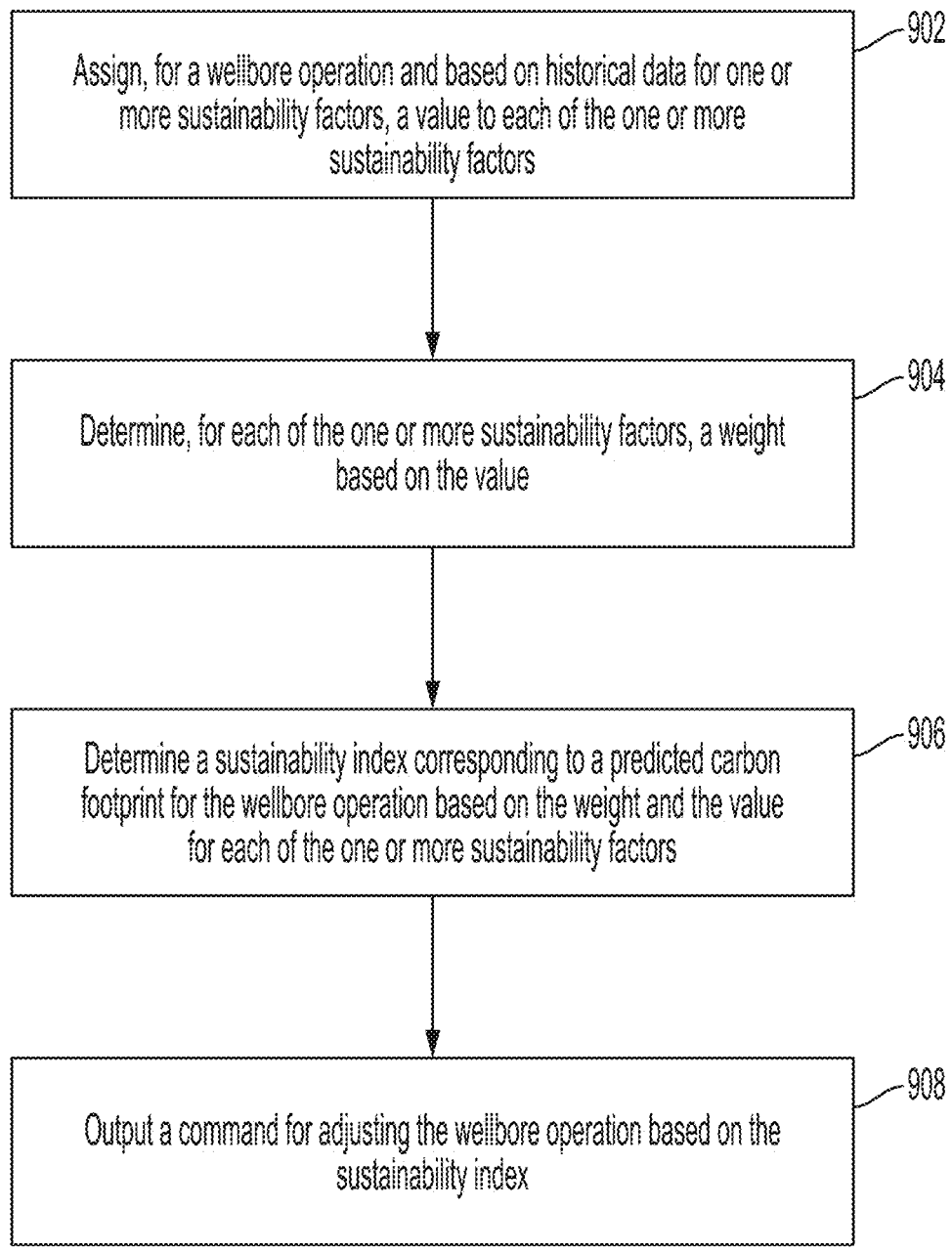
FIG. 9 is a flowchart of a process for determining a sustainability index for a wellbore operation according to one example of the present disclosure.

FIG. 9 is a flowchart of a process for determining a sustainability index for a wellbore operation according to one example of the present disclosure. In block 902, a value can be assigned to each of one or more sustainability factors for the wellbore operation and based on historical data for the one or more sustainability factors. The one or more sustainability factors can include any of an environmental impact, a well design and engineering impact, a functionality and optimization impact, a well and maintenance costs impact, a health and safety impact, and a societal impact. Each of the one or more sustainability factors can have sub-elements that impact the value.

In block 904, a weight for each of the one or more sustainability factors can be determined based on the value. The value for each of the one or more sustainability factors and values for sub-elements of the one or more sustainability factors can be input to an artificial neural network to determine the weight. The artificial neural network can be trained using historical data.

In block 906, a sustainability index corresponding to a predicted carbon footprint for the wellbore operation can be determined based on the weight and the value for each of the one or more sustainability factors. A physics-based model can be used to determine the sustainability index. The sustainability index may be qualitative (e.g., poor, medium, good, or excellent) or quantitative.

In block 908, a command for adjusting the wellbore operation based on the sustainability index can be output. The command may adjust aspects of a well design (e.g., number of wells, a type of wells) or drilling parameters of the wellbore operation in real time. The command may be determined by comparing a sustainability index determined during a design phase of the wellbore operation to a sustainability index determined during an execution phase of the wellbore operation.

In some aspects, a system, method, and non-transitory computer-readable medium for generating a sustainability index for measuring a carbon footprint of a wellbore operation are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a system comprising: a processing device; and a memory device that includes instructions executable by the processing device for causing the processing device to perform operations comprising: assigning, for a wellbore operation and based on historical data for one or more sustainability factors, a value to each of the one or more sustainability factors; determining, for each of the one or more sustainability factors, a weight; determining a sustainability index corresponding to a predicted carbon footprint for the wellbore operation based on the weight and the value for each of the one or more sustainability factors; and outputting a command for adjusting the wellbore operation based on the sustainability index.

Example 2 is the system of example 1, wherein the operation of determining the weight comprises the operation of inputting the value for each of the one or more sustainability factors into an artificial neural network.

Example 3 is the system of any of examples 1-2, wherein the value is a first value and the weight is a first weight and the memory device further includes instructions executable by the processing device for causing the processing device to perform operations comprising: assigning, for the wellbore operation and based on historical data for one or more sub-elements of the one or more sustainability factors, a second value to each of the one or more sub-elements; determining, for each of the one or more sub-elements, a second weight; determining the sustainability index based on the second value and the second weight for each of the one or more sub-elements.

Example 4 is the system of any of examples 1-3, wherein the memory device further includes instructions executable by the processing device for causing the processing device to perform uncertainty analysis on the sustainability index to determine an impact of each of the one or more sustainability factors on the sustainability index.

Example 5 is the system of any of examples 1-4, wherein the memory device includes instructions executable by the processing device to determine the sustainability index by: combining the weight for each of the one or more sustainability factors; and determining an error associated with the sustainability index is less than a predefined threshold.

Example 6 is the system of any of examples 1-5, wherein the one or more sustainability factors comprise an environmental impact corresponding to an impact on an environment for a particular well design, a well design and engineering impact corresponding to an impact of technical limits of the particular well design with reference to sustainability, a functionality and optimization impact corresponding to an impact of practical limits of the particular well design with reference to sustainability, a well and maintenance costs impact corresponding to an impact of lifecycle costs for the particular well design, a health and safety impact corresponding to an impact of hazardous events for the particular well design, and a societal impact corresponding to a societal reaction to the particular well design.

Example 7 is the system of example 1, wherein the weight is a first weight and the sustainability index is a first sustainability index during a design phase of the wellbore operation and the memory device further includes instructions executable by the processing device for causing the processing device to determine a second sustainability index during an execution phase of the wellbore operation by performing operations comprising: determining, for each of the one or more sustainability factors, a second weight based on the value and real-time data; and determining the second sustainability index for the wellbore operation based on the second weight for each of the one or more sustainability factors.

Example 8 is the system of example 7, wherein the memory device further includes instructions executable by the processing device for causing the processing device to determine the command for adjusting the wellbore operation by comparing the first sustainability index to the second sustainability index.

Example 9 is a method, comprising: assigning, for a wellbore operation and based on historical data for one or more sustainability factors, a value to each of the one or more sustainability factors; determining, for each of the one or more sustainability factors, a weight; determining a sustainability index corresponding to a predicted carbon footprint for the wellbore operation based on the weight and the value for each of the one or more sustainability factors; and outputting a command for adjusting the wellbore operation based on the sustainability index.

Example 10 is the method of example 9, wherein the operation of determining the weight comprises the operation of inputting the value for each of the one or more sustainability factors into an artificial neural network.

Example 11 is the method of any of example 9-10, wherein the value is a first value and the weight is a first weight and the method further comprises: assigning, for the wellbore operation and based on historical data for one or more sub-elements of the one or more sustainability factors, a second value to each of the one or more sub-elements; determining, for each of the one or more sub-elements, a second weight; determining the sustainability index based on the second value and the second weight for each of the one or more sub-elements.

Example 12 is the method of any of example 9-11, further comprising performing uncertainty analysis on the sustainability index to determine an impact of each of the one or more sustainability factors on the sustainability index.

Example 13 is the method of any of example 9-12, further comprising: combining the weight for each of the one or more sustainability factors; and determining an error associated with the sustainability index is less than a predefined threshold.

Example 14 is the method of any of example 9-13, wherein the one or more sustainability factors comprise an environmental impact corresponding to an impact on an environment for a particular well design, a well design and engineering impact corresponding to an impact of technical limits of the particular well design with reference to sustainability, a functionality and optimization impact corresponding to an impact of practical limits of the particular well design with reference to sustainability, a well and maintenance costs impact corresponding to an impact of lifecycle costs for the particular well design, a health and safety impact corresponding to an impact of hazardous events for the particular well design, and a societal impact corresponding to a societal reaction to the particular well design.

Example 15 is the method of example 9, wherein the weight is a first weight and the sustainability index is a first sustainability index during a design phase of the wellbore operation and the method further comprises determining a second sustainability index during an execution phase of the wellbore operation by: determining, for each of the one or more sustainability factors, a second weight based on the value and real-time data; and determining the second sustainability index for the wellbore operation based on the second weight for each of the one or more sustainability factors.

Example 16 is the method of example 15, further comprising determining the command for adjusting the wellbore operation by comparing the first sustainability index to the second sustainability index.

Example 17 is a non-transitory computer-readable medium comprising instructions that are executable by a processing device for causing the processing device to perform operations comprising: assigning, for a wellbore operation and based on historical data for one or more sustainability factors, a value to each of the one or more sustainability factors; determining, for each of the one or more sustainability factors, a weight; determining a sustainability index corresponding to a predicted carbon footprint for the wellbore operation based on the weight and the value for each of the one or more sustainability factors; and outputting a command for adjusting the wellbore operation based on the sustainability index.

Example 18 is non-transitory computer-readable medium of example 17, wherein the operation of determining the weight comprises the operation of inputting the value for each of the one or more sustainability factors into an artificial neural network.

Example 19 is the non-transitory computer-readable medium of any of claims 17-18, further comprising instructions executable by the processing device for causing the processing device to perform uncertainty analysis on the sustainability index to determine an impact of each of the one or more sustainability factors on the sustainability index.

Example 20 is the non-transitory computer-readable medium of any of claims 17-19, wherein the weight is a first weight and the sustainability index is a first sustainability index during a design phase of the wellbore operation and the non-transitory computer-readable medium further comprises instructions executable by the processing device for causing the processing device to determine a second sustainability index during an execution phase of the wellbore operation by performing operations comprising: determining, for each of the one or more sustainability factors, a second weight based on the value and real-time data; and determining the second sustainability index for the wellbore operation based on the second weight for each of the one or more sustainability factors.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
    a processing device; and
    a memory device that includes instructions executable by the processing device for causing the processing device to perform operations comprising:
        assigning, for a wellbore operation and based on historical data for one or more sustainability factors, a value to each of the one or more sustainability factors;
        determining, for each of the one or more sustainability factors, a weight;
        determining a sustainability index corresponding to a predicted carbon footprint for the wellbore operation based on the weight and the value for each of the one or more sustainability factors; and
        outputting a command for adjusting drilling parameters of the wellbore operation based on the sustainability index.

2. The system of claim 1, wherein the operation of determining the weight comprises the operation of inputting the value for each of the one or more sustainability factors into an artificial neural network of a set of artificial neural networks, wherein each artificial neural network of the set of neural networks is trained for one of the one or more sustainability factors.

3. The system of claim 1, wherein the value is a first value and the weight is a first weight and the memory device further includes instructions executable by the processing device for causing the processing device to perform operations comprising:
    assigning, for the wellbore operation and based on historical data for one or more sub-elements of the one or more sustainability factors, a second value to each of the one or more sub-elements;
    determining, for each of the one or more sub-elements, a second weight;
    determining the sustainability index based on the second value and the second weight for each of the one or more sub-elements.

4. The system of claim 1, wherein the memory device further includes instructions executable by the processing device for causing the processing device to perform uncertainty analysis on the sustainability index to determine an impact of each of the one or more sustainability factors on the sustainability index.

5. The system of claim 1, wherein the memory device includes instructions executable by the processing device to determine the sustainability index by:
    combining the weight for each of the one or more sustainability factors; and
    determining an error associated with the sustainability index is less than a predefined threshold.

6. The system of claim 1, wherein the one or more sustainability factors comprise an environmental impact corresponding to an impact on an environment for a particular well design, a well design and engineering impact corresponding to an impact of technical limits of the particular well design with reference to sustainability, a functionality and optimization impact corresponding to an impact of practical limits of the particular well design with reference to sustainability, a well and maintenance costs impact corresponding to an impact of lifecycle costs for the particular well design, a health and safety impact corresponding to an impact of hazardous events for the particular well design, and a societal impact corresponding to a societal reaction to the particular well design.

7. The system of claim 1, wherein the weight is a first weight and the sustainability index is a first sustainability index during a design phase of the wellbore operation and the memory device further includes instructions executable by the processing device for causing the processing device to determine a second sustainability index during an execution phase of the wellbore operation by performing operations comprising:
    determining, for each of the one or more sustainability factors, a second weight based on the value and real-time data; and
    determining the second sustainability index for the wellbore operation based on the second weight for each of the one or more sustainability factors.

8. The system of claim 7, wherein the memory device further includes instructions executable by the processing device for causing the processing device to determine the command for adjusting the wellbore operation by comparing the first sustainability index to the second sustainability index.

9. A method, comprising:
    assigning, for a wellbore operation and based on historical data for one or more sustainability factors, a value to each of the one or more sustainability factors;
    determining, for each of the one or more sustainability factors, a weight;
    determining a sustainability index corresponding to a predicted carbon footprint for the wellbore operation based on the weight and the value for each of the one or more sustainability factors; and
    outputting a command for adjusting drilling parameters of the wellbore operation based on the sustainability index.

10. The method of claim 9, wherein the operation of determining the weight comprises the operation of inputting the value for each of the one or more sustainability factors into an artificial neural network.

11. The method of claim 9, wherein the value is a first value and the weight is a first weight and the method further comprises:
    assigning, for the wellbore operation and based on historical data for one or more sub-elements of the one or more sustainability factors, a second value to each of the one or more sub-elements;
    determining, for each of the one or more sub-elements, a second weight;
    determining the sustainability index based on the second value and the second weight for each of the one or more sub-elements.

12. The method of claim 9, further comprising performing uncertainty analysis on the sustainability index to determine an impact of each of the one or more sustainability factors on the sustainability index.

13. The method of claim 9, further comprising:
    combining the weight for each of the one or more sustainability factors; and
    determining an error associated with the sustainability index is less than a predefined threshold.

14. The method of claim 9, wherein the one or more sustainability factors comprise an environmental impact corresponding to an impact on an environment for a particular well design, a well design and engineering impact corresponding to an impact of technical limits of the particular well design with reference to sustainability, a functionality and optimization impact corresponding to an impact of practical limits of the particular well design with reference to sustainability, a well and maintenance costs impact corresponding to an impact of lifecycle costs for the particular well design, a health and safety impact corresponding to an impact of hazardous events for the particular well design, and a societal impact corresponding to a societal reaction to the particular well design.

15. The method of claim 9, wherein the weight is a first weight and the sustainability index is a first sustainability index during a design phase of the wellbore operation and the method further comprises determining a second sustainability index during an execution phase of the wellbore operation by:
    determining, for each of the one or more sustainability factors, a second weight based on the value and real-time data; and
    determining the second sustainability index for the wellbore operation based on the second weight for each of the one or more sustainability factors.

16. The method of claim 15, further comprising determining the command for adjusting the wellbore operation by comparing the first sustainability index to the second sustainability index.

17. A non-transitory computer-readable medium comprising instructions that are executable by a processing device for causing the processing device to perform operations comprising:
    assigning, for a wellbore operation and based on historical data for one or more sustainability factors, a value to each of the one or more sustainability factors;
    determining, for each of the one or more sustainability factors, a weight;
    determining a sustainability index corresponding to a predicted carbon footprint for the wellbore operation based on the weight and the value for each of the one or more sustainability factors; and
    outputting a command for adjusting drilling parameters of the wellbore operation based on the sustainability index.

18. The non-transitory computer-readable medium of claim 17, wherein the operation of determining the weight comprises the operation of inputting the value for each of the one or more sustainability factors into an artificial neural network.

19. The non-transitory computer-readable medium of claim 17, further comprising instructions executable by the processing device for causing the processing device to perform uncertainty analysis on the sustainability index to determine an impact of each of the one or more sustainability factors on the sustainability index.

20. The non-transitory computer-readable medium of claim 17, wherein the weight is a first weight and the sustainability index is a first sustainability index during a design phase of the wellbore operation and the non-transitory computer-readable medium further comprises instructions executable by the processing device for causing the processing device to determine a second sustainability index during an execution phase of the wellbore operation by performing operations comprising:
    determining, for each of the one or more sustainability factors, a second weight based on the value and real-time data; and determining the second sustainability index for the wellbore operation based on the second weight for each of the one or more sustainability factors.

\* \* \* \* \*